US010848331B2

(12) United States Patent
Roy

(10) Patent No.: US 10,848,331 B2
(45) Date of Patent: Nov. 24, 2020

(54) MULTI-NODE NETWORK WITH ENHANCED ROUTING CAPABILITY

(71) Applicant: NXP B.V., Eindhoven (NL)

(72) Inventor: Rajeev Roy, Den Bosch (NL)

(73) Assignee: NXP B.V., Eindhoven (NL)

( * ) Notice: Subject to any disclaimer, the term of this patent is extended or adjusted under 35 U.S.C. 154(b) by 54 days.

(21) Appl. No.: 16/225,491

(22) Filed: Dec. 19, 2018

(65) Prior Publication Data

US 2020/0204383 A1 Jun. 25, 2020

(51) Int. Cl.
*H04L 12/18* (2006.01)
*H04L 29/08* (2006.01)
*H04L 29/06* (2006.01)
*H04W 4/40* (2018.01)
*H04L 29/12* (2006.01)

(52) U.S. Cl.
CPC .......... *H04L 12/18* (2013.01); *H04L 61/6022* (2013.01); *H04L 69/16* (2013.01); *H04L 69/324* (2013.01); *H04W 4/40* (2018.02)

(58) Field of Classification Search
CPC ....... H04L 12/18; H04L 69/16; H04L 69/324; H04L 61/6022; H04W 4/40
See application file for complete search history.

(56) References Cited

U.S. PATENT DOCUMENTS

| 5,500,860 | A | * | 3/1996 | Perlman | H04L 12/4625 370/401 |
|---|---|---|---|---|---|
| 6,006,272 | A | * | 12/1999 | Aravamudan | H04L 29/12009 709/220 |
| 6,538,997 | B1 | * | 3/2003 | Wang | H04L 12/462 370/241 |
| 7,720,055 | B2 | | 5/2010 | Kadambi et al. | |
| 8,345,555 | B2 | * | 1/2013 | Sendrowicz | H04W 40/02 370/236 |
| 9,124,529 | B1 | * | 9/2015 | Chadha | H04L 43/50 |
| 2003/0174725 | A1 | | 9/2003 | Shankar | |
| 2007/0224982 | A1 | * | 9/2007 | Jeon | H04M 1/7253 455/419 |
| 2007/0286186 | A1 | | 12/2007 | Balandina et al. | |

(Continued)

OTHER PUBLICATIONS

Introduction to IP Multicast; RST-1261; Cisco Networkers 2006.

(Continued)

*Primary Examiner* — Rasheed Gidado
(74) *Attorney, Agent, or Firm* — Rajeev Madnawat

(57) ABSTRACT

Aspects are directed toward a data-communication approach using an arrangement of node-node communication according to a protocol involving layered routing of payload as might be similar to layered-based communication-protocol standards used in automotive applications. A particular payload is conveyed between nodes via a protocol having a data link layer and a network layer, the latter being used to indicate to which node(s) the payload is to be routed. For compatibility with standard(s), the protocol accommodates transfer of data between nodes by permitting for use of both the data link and network layers. In some implementations, to increase efficiency and processing overhead for payload transmissions, the protocol does not require use of the network layer to indicate where to transfer the payload.

19 Claims, 2 Drawing Sheets

(56) References Cited

U.S. PATENT DOCUMENTS

| | | | | |
|---|---|---|---|---|
| 2012/0076014 A1* | 3/2012 | Bragg | ................... | H04L 45/22 |
| | | | | 370/252 |
| 2013/0064247 A1* | 3/2013 | Song | ................. | H04L 12/4641 |
| | | | | 370/392 |
| 2014/0269410 A1* | 9/2014 | Shah | ..................... | H04L 45/32 |
| | | | | 370/254 |
| 2017/0170900 A1* | 6/2017 | Petrucci | ................ | H04B 10/03 |
| 2019/0335379 A1* | 10/2019 | Joseph | ................ | H04W 28/06 |

OTHER PUBLICATIONS

Frame replication and elimination for reliability; IEEE standard; IEEE 802.1CB-2017.

OSI Layers in Automotive Networks, Bosch, IEEE 802.1 Plenary Meeting, Orlando, Mar. 20, 2013.

\* cited by examiner

MULTI-NODE NETWORK WITH ENHANCED ROUTING CAPABILITY

OVERVIEW

Aspects of various embodiments are directed toward methods and apparatuses involving data communication in a multi-node network characterized by circuit-based nodes.

One type of data communication system in this context uses communication protocols which comply with IEEE 802.1CB, involving multi-node network arrangements in which protocols for intra-communications between nodes provide identification and replication of packets for redundant transmission. According to the IEEE 802.1CB standard, OSI (Open System Interconnection) models are used for indicating to which node or nodes a payload (in the form of data) is to be sent. This is achieved by using an OSI data link layer to carry the data and an OSI network layer to indicate where in the system the payload is to be sent or routed. Such protocols have been established and used to provide secure and safe communications in different environments including, for example, communications within smart automobiles. However, meeting communications needs becomes increasingly challenging as the demands for processing speed increase and the demands for power consumption and related overhead decrease.

These and other matters have presented challenges to such systems and methods of communications, for a variety of applications.

SUMMARY

Various example embodiments are directed to addressing issues such as those addressed above and/or others which may become apparent from the following disclosure, including those issues involving multi-node networks used in automotive and/or industrial environments. In particular example applications, aspects of the disclosure are directed to communication in which compatibility with known/standard protocols is important.

In certain example embodiments, aspects of the present disclosure involve methods and/or apparatuses (e.g., systems, circuits) for increasing efficiency of the transmission of payload data in multi-node communication systems. These approaches may, for example, be implemented following currently established communication protocols.

Embodiments of the disclosure are directed to a data communication method, for use by an arrangement of nodal circuits within a multi-node network used to pass (forward) payload data from a first (sending) nodal circuit to a selected nodal circuit, in accordance with a nodal communication protocol in which the data link layer with an associated payload header conveys payload data within the network having a network layer. The network layer and an associated network header are used to indicate routing information, including identification of the selected one of the nodal circuits to receive the payload data from the sending nodal circuit as an originating source of the payload data within the network. The payload data is sent to the selected nodal circuit by the sending nodal circuit by configuring the payload header to identify the sending nodal circuit as the source of the payload data for receipt by the selected nodal circuit. The selected nodal circuit receives and processes the payload data as identified from the configured payload header indicating that the sending nodal circuit is the source of the payload data being to the selected nodal circuit.

In a more-specific example embodiment, aspects of the invention disclosure are directed to a data communications method, for use by an arrangement of nodal circuits within a multi-node network, in which payload data is sent from a sending nodal circuit to a selected nodal circuit via an intervening nodal circuit, in accordance with a nodal communication protocol in which a data link layer with associated payload header conveys payload data within the network. The payload data is sent to the selected nodal circuit by the sending nodal circuit, by configuring the payload header to identify the sending nodal circuit as the source of the payload data for receipt by the selected nodal circuit. The selected nodal circuit receives and processes the payload data as identified from the configured payload header, which indicates that the sending nodal circuit is the source of the payload data being sent to the selected nodal circuit. The intervening nodal circuit is used to send the received payload data to the selected nodal circuit by configuring the data link layer to identify the intervening nodal circuit as being a source of the payload data. At the selected one of the nodal circuits, payload data is received and processed as identified from the configured data link layer as sent by the intervening nodal circuit. The configured data link layer indicates that the sending nodal circuit is the source of the payload data being sent to the selected nodal circuit.

Embodiments of the invention disclosure are directed to an apparatus having an arrangement of nodal circuits for data communications in which a sending nodal circuit is configured to send payload data to a selected nodal circuit via an intervening nodal circuit. The intervening nodal circuit is configured to pass the payload data to the selected nodal circuit according to a nodal communication protocol having a data link layer having an associated payload header that is used to convey the payload data within the network. The network, having a network layer and associated network header, conveys routing information that identifies the selected nodal circuit to receive the payload data from the sending nodal circuit as an originating source of the payload data within the network. The intervening nodal circuit is further configured to receive payload data, as indicated in the data link layer (and in accordance with nodal communication protocol) from the sending nodal circuit to the selected nodal circuit. Payload data received by the intervening nodal circuit is sent to the selected nodal circuit by configuring the data link layer to identify the intervening nodal circuit as being a source of the payload data. The selected nodal circuit is configured to receive and process the payload data as identified from the configured data link layer, as sent by the intervening nodal circuit, using the configured data link layer to indicate that the sending nodal circuit is the source of the payload data sent to the selected nodal circuit.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
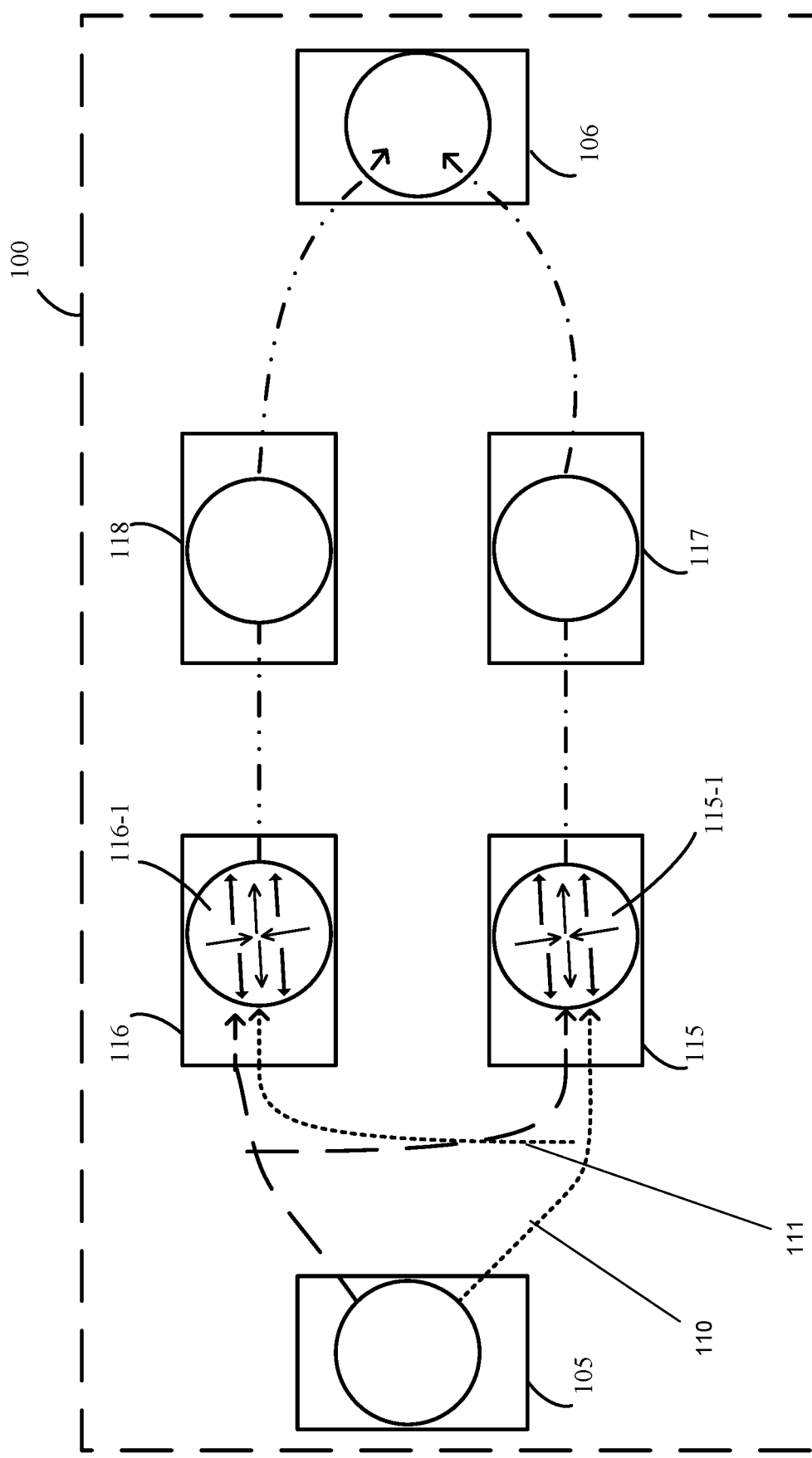
FIG. 1 is a system-level diagram illustrating an example multi-node communications network, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving multi-node communications networks, which may be carried out using different nodal communication protocols. In certain implementations, aspects of the present disclosure have been shown to be beneficial when used in the context of transmitting payload data in a closed communications system which uses a communication protocol having multiple (e.g., stacked) layers for sending and receiving data between various circuits ("nodes" or "nodal circuits") situated at various system locations in the communication network. As examples, communications networks within automobiles and industrial facilities often use such closed communications systems. While not necessarily so limited, various aspects may be appreciated through the following discussion of non-limiting examples which use such specific exemplary contexts.

Accordingly, in the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In specific example embodiments, aspects of the present disclosure are directed to a method for communicating data in a multi-node network characterized by an arrangement of nodal circuits. A first (sending) node is configured to send payload data to a selected one of the nodal circuits according to a nodal communication protocol having a data link layer with associated payload header and a network layer and associated header. The data link layer and associated header are used to convey payload data within the network, while the network layer and associated network header are used to indicate routing information. Included in the routing header is information conveying which of the nodal circuits is to receive the payload data from the sending nodal circuits, and identifying the sending nodal circuit as an originating source of the payload data within the network. The sending nodal circuit sends the payload data to the selected nodal circuit by configuring its payload header to identify the sending nodal circuit as being a source of the payload data for receipt by the selected nodal circuits. The selected nodal circuit receives and processes the payload data as identified from the configured payload header, thereby indicating that the sending nodal circuit is the source of the payload data.

In additional example embodiments, the multi-node network is part of a closed network, and allows data to be shared internally within the arrangement of nodal circuitry in accordance with a nodal communication protocol. The data link layer specifies redundancy information for sharing payload data and its associated header at multiple locations in the arrangement of nodal circuits. Circuitry within the multi-node network receives and processes the payload data by ascertaining routing destination information from the payload header, and in turn shares the information via a switch included in the arrangement of circuits, configured to route the information according to the nodal communication protocol.

Additional example embodiments related to the present invention disclosure utilize a switch and/or switching-acting circuitry within the arrangement of circuits that is configured to selectively route information in accordance with the nodal communication protocol. The switch is used to send other payload data with its associated payload header as defined by the nodal communication protocol, and to convey the other payload data while providing routing information for the other payload data in a network header, also according to the nodal communication protocol.

Depending on the application and/or design-specification requirements at issue, each node (or nodal circuit) may be implemented using different types of communication-enabling circuitry such as discrete logic circuitry (e.g., flip flops, logic gates, etc.) and/or data-processors (or computers) including but not limited to microcomputers as implemented in single-chip or multi-chip IC packages. In this processor computer context, it would be appreciated that a computer program may embody instructions for carrying out the various actions discussed herein in connection with each such node.

In various example embodiments related to the present invention disclosure, each of the nodal circuits uses a data link layer, in accordance with nodal communication protocol, to indicate routing information between the nodal circuits. The nodal communication protocol used by the nodal circuits may be compatible with IEEE 802.1CB, enabling the data bits to be encoded, decoded, and organized in the data link layer before they are transported as frames within the multi-node network environment.

Additional example embodiments, aspects of the present disclosure are directed to an arrangement (network) of nodal circuits each of which includes a respective identification address, such as a Media Access Control (MAC) or physical location address, known throughout the closed-network communication system. In some embodiments, the nodal communication protocol used to convey information throughout the network further includes a rule prohibiting sharing the respective identification addresses of nodal circuitry within the network to external circuitry, outside the closed-network communication system.

Additional embodiments are related to an arrangement of nodal circuits consistent with what may be found in an automotive-vehicle communication system installed in an automotive vehicle, in which data is share internally within the nodal circuits. In such a system, each of the nodal circuits includes a respective identification code corresponding to a MAC address, or physical location address, known within the automotive-vehicle communication system. The nodal communication protocol employed prohibits conveying the respective identification codes to external circuitry which is outside the automotive-vehicle communication system.

In specific example embodiments, aspects of the present disclosure are directed toward multi-node networks which may be characterized as automotive-vehicle communication systems and installed in automotive-vehicles in which data is shared internally within the arrangement of nodal circuits. The sending nodal circuit and selected nodal circuit include a respective identification code corresponding to a MAC address (or other physical identification address) known within the communication system. Additionally, the network uses a User Datagram Protocol (UDP) with a multicast destination address indicated in the data link layer and associated payload header to establish connection within the arrangement of nodal circuits.

In accordance with more specific embodiments, which may relate to and largely incorporate aspects of the above-mentioned embodiments, the sending node configures (programs) the data link layer to send the payload data between nodal circuits in the network. These nodal circuits use the data link layer to indicate routing information for communications between a sending and a selected nodal circuits. Depending on the application, the sending and selected nodal circuits may be identical (e.g., refer to the same node), different, and/or part of an ad hoc nodal communications system. The associated payload header can then be configured and used to convey the payload data without indicating the routing information in the network header associated with the network layer. Each of the nodal circuits is characterized by a respective identification code corresponding to a Media Access Control (MAC) address (or physical location address), known within the closed-environment communication system. Transmission/expression of these MAC addresses to external circuitry is prohibited by communication protocol.

In additional example embodiments, aspects of the present disclosure are directed to a method for communicating data in a multi-node network characterized by an arrangement of nodal circuits. A first (sending) node is configured to send payload data to a selected one of the nodal circuits via an intervening nodal circuit. The intervening nodal circuit is configured to pass (forward) the payload data to the selected nodal circuit according to a nodal communication protocol having a data link layer with associated payload header and a network layer and associated header. The data link layer and associated header is used to convey payload data within the network while the network layer and associated network header is used to indicate routing information. Included in the routing header is information conveying which of the nodal circuits is to receive the payload data from the sending nodal circuits and identifying it as an originating source of the payload data within the network. The intervening nodal circuit sends the received payload data to the selected one of the nodal circuits by configuring the data link layer to identify the intervening nodal circuit as being a source of the payload data. The selected nodal circuit receives and processes the payload data as identified from the configured data link layer, as sent by the intervening nodal circuit. Using the configured data link layer, the selected nodal circuit identifies the sending nodal circuit is the source of the payload data being sent.

Additional example embodiments, which may be related to the above-described method and in accordance with the present disclosure, are directed to an apparatus (e.g., circuit/circuitry) for communicating data in a multi-node network characterized by an arrangement of circuits. A sending nodal circuit is configured to send payload data to a selected nodal circuit via an intervening nodal circuit. The intervening nodal circuit is configured to pass the payload data to the selected nodal circuit according to a nodal communication protocol having a data link layer and associated payload header along with a network layer and associated network header. Conveyed in the data link layer is the payload. Routing information (identifying the selected nodal circuit as the recipient of the payload data from the sending nodal circuit and identifying the sending nodal circuit as the originating source of the payload data) is conveyed in the network header. The intervening nodal circuit is configured to receive payload data from the sending nodal circuit for receipt by the selected nodal circuit in accordance with the nodal communication protocol. Furthermore, the intervening nodal circuit sends the received payload data to the selected nodal circuit by configuring the data link layer to identify the intervening nodal circuit as being a source of the payload data. The selected nodal circuit is configured to receive and process the payload data identified in the configured data link layer, as sent by the intervening nodal circuit, the configured data link layer also indicating the first nodal circuit is the source of the payload data being sent to the selected nodal circuit.

In specific example embodiments, the above-described closed-network communication system installed in an automotive vehicle (e.g., an automobile). In some such embodiments, each of the nodal circuits may include a respective identification address known within the closed-network communication system. The nodal communication protocol utilized by this closed-network includes a rule prohibiting conveying the respective identification address of nodal circuits within the closed-network to external circuitry, which is outside the closed-network communication system.

Further embodiments reflecting aspects of the present disclosure are directed to a multi-node network configured to share data internally within the arrangement of nodal circuits according to a nodal communication protocol. To do so, the data link layer specifies redundancy; information for sharing the payload data to multiple nodal circuits including a selected nodal circuit. Each nodal circuit is spread across various and/or multiple physical locations throughout the network and can be identified by the payload header. Also in accordance with nodal communication protocol, routing information contained within the network header may be used to identify routing destination information, or such information may be ascertained from the payload header.

Specific example embodiments of the present disclosure can be implemented with nodal communication protocols in which intra-communications between nodes provide identification and replication of packets for redundant transmission and, in some applications, identification of duplicate packets. While communicating in accordance to these protocols, a switch-acting intervening nodal circuit indicates routing information via the data link layer and associated payload header, before a payload (in the form of data packets) is transported from a sending nodal circuit to a selected nodal circuit that receives the payload data.

In some embodiments when the multi-node communications network is communicating via protocols complying with the IEEE 802.1CB standard, the payload data is encoded, decoded and organized for transporting via the data link layer (e.g., in an OSI or Open System Interconnection model), before a payload (in the form of data packets) is transported within the multi-node network environment. In order for the system to understand where to send (or route)

the payload amongst the nodes of the multi-node network, another layer is used to indicate/identify which node (or nodes in a redundant system) is prepared before the payload data is sent. In the OSI model, this other layer may be implemented as the network layer. As applied communication approaches which are in compliance with the OSI model and/or IEEE 802.1CB protocols, in connection with the present disclosure, it has been discovered that communications in such environments can realize significant improvement in terms of processing speed, power consumption and related overhead by way of changing use of such data link and network layers without encroaching upon, and rather simplifying, use of these layers in such communications applications.

Other example embodiments permit for the above-characterized approach to utilize the above-characterized aspects for applications in which payload data is permitted to be communicated for applications involving different types of nodal circuits. These types include: one type in which a sending nodal circuit is configured to send payload data to a selected nodal circuit by way of an intervening nodal circuit (such as a switch-acting circuit) based upon the configuration of the respective payload header and the routing information contained therein; or another type of nodal circuit in which a sending nodal circuit is configured to send payload data to a selected nodal circuit based upon the configuration of the respective payload header and the routing confirmation contained therein.

In accordance with the embodiments of the present disclosure, FIG. 1 depicts a closed-network communication system comprised of an arrangement of nodes 100. Included within the arrangement of nodes is sending nodal circuit 105, selected nodal circuit 106, and intervening nodal circuits 115-118. Communications bus 110 and redundant communications bus 111 is used to transmit payload data between sending node 105 and intervening nodes 115 and 116. Switch-acting circuitry 115-1 and 116-1, as may be included in intervening nodal circuits 115 and 116 route the payload data throughout the arrangement of nodal circuits. After being routed to and processed by additional intervening nodes 117 and 118, the payload data is conveyed to selected node 106.

Figure 2:
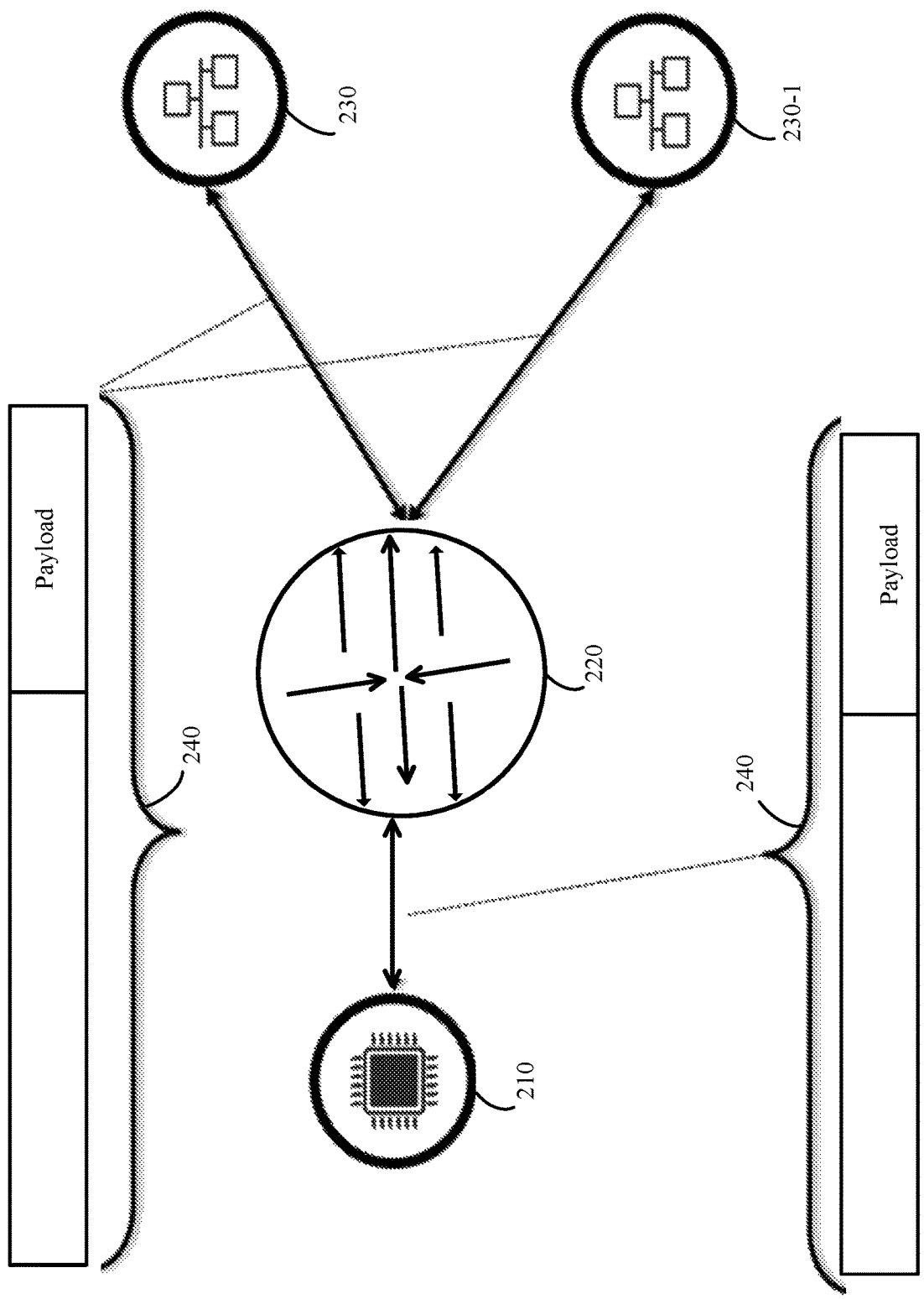
FIG. 2 illustrates an example of a multi-node communications system installed in an industrial facility, also in accordance with the present disclosure.

Also in accordance with the embodiments of the present disclosure, FIG. 2 depicts a closed-network communication system including a sending node 210, an intervening node 220, and multiple selected nodes 230, 230-1. Using and routing information contained within the enhanced payload header 240, payload data is conveyed from sending node 210 to selected nodes 230, 230-1 via the intervening node 220.

As may be implemented in accordance with the above-mentioned embodiments, the arrangement of nodal circuits as depicted in FIG. 1 may be implemented as a closed-network, multi-node communications system within a smart automotive environment. The arrangement of nodal circuits 100 includes at least one sending nodal circuit (e.g., an ECU) 105 and selected nodal circuit (e.g. another ECU) 106 and multiple ECU-subservient intervening nodal circuits 115-118. The ECUs may be implemented as an embedded electronic devices responsible for overseeing the operation and regulation of various other electrical systems within the automotive environment. During operation of an automobile, sending nodal circuit 105 and selected nodal circuit 106 are in constant communication with ECU-subservient intervening nodal circuits 115-118 via vehicle communications bus 110. A vehicle communications bus implemented in this manner may provide a specialized means of transmitting data conveying vital information (engine timing, fuel injection, wheel speed), optimized to ensure proper operation of the electrical systems contained within an automobile. Given the high demand placed on efficiency and reliability of data transmission in such an automotive environment, certain assurances and redundancies are built into the transmission of payload data throughout the closed, multi-node communications network of an automobile. The inclusion of redundant vehicle communications bus 111 increases efficiency and reliability while simultaneously decreasing processing overhead of payload transmission between nodes of the communications network.

One specific, non-limiting use-case scenario involving such data transmission within the environment of an industrial facility, as depicted in FIG. 2, relates to automotive servicing, during which a mechanic connects a diagnostic tool (sending nodal circuit 210) to a diagnostic port (intervening nodal circuit 220) of an automobile. The diagnostic tool then receives payload data relevant to the proper maintenance and operation of the vehicle (e.g., fluid levels, engine timing, tire pressure) from the selected nodal circuitry 230, 230-1 located at various locations throughout the automobile, each having a respective identification code corresponding to a MAC address, or physical location address. Transmission of any data stored, encoded, encrypted, or otherwise accounted for by the enhanced payload 240 to any external devices (e.g. the diagnostic tool) utilized as part of the servicing is prohibited. This data may, for example, relate to the payload data, routing information, or information related to the nodal circuitry of the automobile's multi-node communications network that is being diagnosed.

In accordance with the more-specific embodiments, which may relate to and largely incorporate aspects of the above-mentioned embodiments, the sending node configures (programs) the data link layer to send the payload data between nodal circuits in the network. These nodal circuits use the data link layer to indicate routing information for communications between a sending and a selected nodal circuit. Depending on the application, the sending and selected nodal circuit may be identical (e.g., refer to the same node), different, and/or part of an ad hoc nodal communication system. The associated payload header can then be configured and used to convey the payload data without indicating the routing information in the network header associated with the network layer. Each of the nodal circuits may be characterized by a respective identification code corresponding to a Media Access (MAC) address (or other physical address), known within the closed-network communication system. The transmission and/or expression of this and/or other similar information related to the identification of nodal circuitry within the closed-network is prohibited by nodal communication protocol. The sharing of data within the arrangement of nodes comprising the closed-network communication system may be implemented through User Datagram Protocol (UDP) with a multicast destination address. In accordance with UDP, the data link layer and associated payload header is used to establish connections within the arrangement of nodal circuits.

Terms to exemplify orientation, such as upper/lower, left/right, top/bottom, first/second, and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, node, nodal circuitry and/or other circuit-type depictions (e.g., reference numerals 105, 106, and 115-118 of FIG. 1 depict a nodal circuit/nodal circuitry as described herein). Such circuits or circuitry are used together with other elements to exemplify how certain embodiments may be carried out in the form or structures, steps, functions, operations, activities, etc. As another example, where the Specification may make reference to a "first [type of structure]", a "second [type of structure]", a "selected [type of structure], etc., where the [type of structure] might be replaced with terms such as ["circuit", "circuitry", "node", "nodal circuitry", and others], the adjectives "first", "second", and "selected" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. A method for communicating data in a multi-node network characterized by an arrangement of nodal circuits some of which being connected to one another using a plurality of redundant data-communications buses, the method comprising:
    providing a first sending one of the nodal circuits configured to send payload data to a selected one of the nodal circuits via one of the plurality of redundant data-communications buses according to a nodal communication protocol, the nodal communication protocol having a data link layer associated with a payload header used to convey the payload data within the network and having a network layer associated with a network header used to indicate routing information including identification of the selected one of the nodal circuits to receive the payload data from the first sending one of the nodal circuits as an originating source of the payload data within the network;
    using the first sending one of the nodal circuits to send the payload data to the selected one of the nodal circuits by configuring the payload header to identify the first sending one of the nodal circuits as being a source of the payload data for receipt by the selected one of the nodal circuits; and
    at the selected one of the nodal circuits, receiving and processing the payload data as identified from the configured payload header indicating that the first sending one of the nodal circuits is the source of the payload data being sent to the selected one of the nodal circuits, wherein each of the nodal circuits includes a respective identification address known within a closed-network communication system.

2. The method of claim 1, wherein the multi-node network is part of a closed network including data shared internally within the arrangement of nodal circuits according to the communication protocol, wherein the data link layer specifies redundancy information for sharing the payload data at multiple locations in the arrangement of nodal circuits, wherein circuitry within the multi-node network receives and processes the payload data by ascertaining routing destination information from the payload header, and wherein the arrangement of nodal circuits includes a switch circuit configured to selectively route information in accordance with the nodal communication protocol.

3. The method of claim 1, wherein the arrangement of nodal circuits includes a switch circuit at configured to selectively route information in accordance with the nodal communication protocol, and further including the step of using the switch circuit to send other payload data with a payload header, as defined by the nodal communication protocol, being configured to convey the other payload data while providing routing information for the other payload data in a network header as defined by the nodal communication protocol.

4. The method of claim 1, wherein the nodal communication protocol is compatible with IEEE 802.1CB wherein data bits are encoded, decoded and organized in the data link layer, before they are transported as frames within the multi-node network.

5. The method of claim 1, wherein each of the nodal circuits uses a data link layer, in accordance with the nodal communication protocol, to indicate routing information for communications between the nodal circuits.

6. The method of claim 1, wherein each of the nodal circuits is a respective part of a communication system installed in an automotive vehicle.

7. The method of claim 1, wherein each of the nodal circuits is as a respective part of a communication system installed in an industrial facility.

8. The method of claim 1, wherein the nodal communication protocol includes a rule which prohibits conveying the respective identification addresses to external circuitry which is outside the closed-network communication system.

9. The method of claim 1, wherein each of the nodal circuits includes a respective identification code corresponding to a MAC (Media Access Control) address, or physical location address, known within a communication system.

10. The method of claim 1, wherein each the nodal circuits is as a respective part of an automotive-vehicle communication system installed in an automotive vehicle, and wherein each of the nodal circuits includes a respective identification code corresponding to a MAC (Media Access Control) address, or physical location address, known within the automotive-vehicle communication system, and the nodal communication protocol includes a rule which prohibits conveying the respective identification codes to external circuitry which is outside the automotive-vehicle communication system.

11. The method of claim 1, wherein the multi-node network is characterized as automotive-vehicle communication system installed in an automotive vehicle and in which data shared internally within the arrangement of nodal circuits, wherein each of the nodal circuits includes:
    a respective identification code corresponding to a MAC (Media Access Control) address, or physical location address, known within a communication system; and uses a UDP (User Datagram Protocol) with a multicast destination address indicated in the data link layer and associated payload header for establishing connections within the arrangement of nodal circuits.

12. The method of claim 1, wherein each of the nodal circuits is as a respective part of an ad hoc nodal communication system.

13. A method for communicating data in a multi-node network characterized by an arrangement of nodal circuits, the method comprising:
   providing a first sending one of the nodal circuits configured to send payload data to a selected one of the nodal circuits via an intervening one of the nodal circuits, wherein the intervening one of the nodal circuits is configured and arranged to pass the payload data to the selected one of the nodal circuits according to a nodal communication protocol, the nodal communication protocol having a data link layer associated with a payload header used to convey the payload data within the network, and having a network layer associated with a network header used to indicate routing information, the routing information including identification of the selected one of the nodal circuits to receive the payload data from the first sending one of the nodal circuits as an originating source of the payload data within the network;
   using the intervening one of the nodal circuits to send the received payload data to the selected one of the nodal circuits by configuring the data link layer to identify the intervening one of the nodal circuits as being a source of the payload data; and
   at the selected one of the nodal circuits, receiving and processing the payload data as identified from the configured data link layer and sent by the intervening one of the nodal circuits, and with the configured data link layer indicating that the first sending one of the nodal circuits is the source of the payload data being sent to the selected one of the nodal circuits.

14. An apparatus configurable for communicating data in a multi-node network characterized by an arrangement of nodal circuits, the apparatus comprising:
   a first sending one of the nodal circuits configured to send payload data to a selected one of the nodal circuits via an intervening one of the nodal circuits, wherein the intervening one of the nodal circuits is configured and arranged to pass the payload data to the selected one of the nodal circuits according to a nodal communication protocol, the nodal communication protocol having a data link layer associated with a payload header used to convey the payload data within the network and having a network layer with associated with a network header used to indicate routing information including identification of the selected one of the nodal circuits to receive the payload data from the first sending one of the nodal circuits as an originating source of the payload data within the network;
   the intervening one of the nodal circuits further configured and arranged to receive payload data, as indicated in the data link layer according to the nodal communication protocol, from the first sending one of the nodal circuits for receipt by the selected one of the nodal circuits, at the intervening one of the nodal circuits, and
   send the received payload data to the selected one of the nodal circuits by configuring the data link layer to identify the intervening one of the nodal circuits as being a source of the payload data; and
   the selected one of the nodal circuits configured and arranged to receive and process the payload data as identified from the configured data link layer and sent by the intervening one of the nodal circuits, and with the configured data link layer indicating that the first sending one of the nodal circuits is the source of the payload data being sent to the selected one of the nodal circuits.

15. The apparatus of claim 14, wherein each of the nodal circuits is installed in a closed-network communication system in an automotive vehicle and includes a respective identification address known within the closed-network communication system, and wherein the nodal communication protocol includes a rule that prohibits conveying the respective identification addresses to external circuitry that is outside the closed-network communication system.

16. The apparatus of claim 14, wherein each of the nodal circuits is a respective part of a communication system installed in an automotive vehicle.

17. The apparatus of claim 14, wherein the multi-node network is configured to share data internally within the arrangement of nodal circuits according to the communication protocol, wherein the data link layer specifies redundancy information for sharing the payload data to a plurality of nodal circuits including the selected one of the nodal circuits, each of the plurality of nodal circuits being at multiple physical locations in the network and being identified by the payload header.

18. The apparatus of claim 14, further including circuitry within the multi-node network being configured to receive and process the payload data, in accordance with the nodal communication protocol, by ascertaining routing destination information from the payload header when the payload header is used to identify the routing destination information, and by ascertaining the routing destination information from the network header when the network header is used to identify the routing destination information.

19. The apparatus of claim 14, wherein each of the nodal circuits includes:
   a respective identification code corresponding to a MAC (Media Access Control) address, or physical location address, known within a communication system; and
   uses a UDP (User Datagram Protocol) with a multicast destination address indicated in the data link layer and associated payload header for establishing connections within the arrangement of nodal circuits.

* * * * *